United States Patent
Splitt (10) Patent No.: US 10,323,673 B2
(45) Date of Patent: Jun. 18, 2019

(54) METALLIC HOLDING ELEMENT FOR INTRODUCING A TORQUE INTO A PLASTIC HOUSING

(71) Applicant: CONTINENTAL AUTOMOTIVE GMBH, Hannover (DE)

(72) Inventor: Michael Splitt, Pentling (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/650,148

(22) Filed: Jul. 14, 2017

(65) Prior Publication Data
US 2017/0314605 A1    Nov. 2, 2017

Related U.S. Application Data

(63) Continuation of application No. PCT/DE2015/200499, filed on Nov. 12, 2015.

(30) Foreign Application Priority Data

Jan. 15, 2015 (DE) .......................... 10 2015 200 505

(51) Int. Cl.
*F16B 37/04* (2006.01)
*F16B 37/06* (2006.01)
(Continued)

(52) U.S. Cl.
CPC .......... *F16B 37/068* (2013.01); *F16B 37/122* (2013.01); *B29C 65/562* (2013.01);
(Continued)

(58) Field of Classification Search
CPC .... F16B 37/068; F16B 37/048; F16B 37/122; B29C 65/565; B29C 65/603
(Continued)

(56) References Cited

U.S. PATENT DOCUMENTS 3,304,830 A * 2/1967 Shackelford ........ B25B 27/0007
29/524.1
3,311,148 A * 3/1967 Leitner ................. F16B 39/282
29/432
(Continued)

FOREIGN PATENT DOCUMENTS

DE     29718724        9/1998
DE     10319978 A1    12/2004
(Continued)

OTHER PUBLICATIONS

International Search Report and Written Opinion dated Feb. 21, 2016 from corresponding International Patent Application No. PCT/DE2015/200499.
(Continued)

*Primary Examiner* — Gary W Estremsky (57) ABSTRACT

A metallic holding element for absorbing or introducing a torque in a plastic housing is presented, wherein the holding element in the holding area features a profile with three, four, or five main corners, which are connected to each other via straight or convex edges, preferably the edges are generally curved in a convex manner respectively through one or more obtuse-angled intermediate corners.

7 Claims, 5 Drawing Sheets

(51) Int. Cl.
*F16B 37/12* (2006.01)
*B29C 65/64* (2006.01)
*B29L 31/34* (2006.01)
*B29C 65/56* (2006.01)
*B29C 65/00* (2006.01)

(52) U.S. Cl.
CPC .............. *B29C 65/64* (2013.01); *B29C 66/21* (2013.01); *B29C 66/5414* (2013.01); *B29C 66/742* (2013.01); *B29L 2031/3481* (2013.01)

(58) Field of Classification Search
USPC .......... 411/180; 403/193, 280, 282; 361/807
See application file for complete search history.

(56) References Cited

U.S. PATENT DOCUMENTS

| | | | | |
|---|---|---|---|---|
| 5,149,235 | A * | 9/1992 | Ollis | F16B 37/065 411/41 |
| 5,253,966 | A * | 10/1993 | Clemens | F02M 35/10072 249/165 |
| 6,379,196 | B1 * | 4/2002 | Greenberg | H01H 71/08 335/202 |
| 6,494,761 | B1 * | 12/2002 | Amaral | A63H 1/30 446/236 |
| 6,514,005 | B2 * | 2/2003 | Shiokawa | F16B 37/122 403/253 |
| 6,826,820 | B2 * | 12/2004 | Denham | F16B 37/067 29/524.1 |
| 6,945,728 | B2 * | 9/2005 | Woodard | F16B 4/004 403/248 |
| 7,223,056 | B2 * | 5/2007 | Schneider | F16B 37/067 411/183 |
| 2004/0086356 | A1 * | 5/2004 | Chen | F16B 37/145 411/182 |
| 2005/0084362 | A1 | 4/2005 | Nah | |
| 2005/0095078 | A1 * | 5/2005 | Makino | F16B 37/067 411/183 |
| 2009/0313803 | A1 | 12/2009 | Niedermuller et al. | |
| 2014/0044476 | A1 * | 2/2014 | Cove | B29C 65/08 403/270 |
| 2014/0290425 | A1 * | 10/2014 | Kaijala | G05G 1/44 74/512 |

FOREIGN PATENT DOCUMENTS

| | | |
|---|---|---|
| DE | 102009039817 A1 | 3/2011 |
| DE | 102010020682 A1 | 11/2011 |
| DE | 102012215587 | 6/2014 |
| EP | 1033502 A1 | 9/2000 |
| WO | 2006119401 A3 | 9/2006 |

OTHER PUBLICATIONS

German Search Report dated Sep. 21, 2015 for corresponding German Patent Application No. 10 2015 200 505.4.
Chinese Office Action dated Jun. 25, 2018 for corresponding Chinese application No. 201580072482.4.

* cited by examiner

METALLIC HOLDING ELEMENT FOR INTRODUCING A TORQUE INTO A PLASTIC HOUSING

CROSS REFERENCE TO RELATED APPLICATION

This application claims the benefit of International application No. PCT/DE2015/200499, filed Nov. 12, 2015, which is hereby incorporated by reference.

TECHNICAL FIELD

The technical field relates to a metallic holding element for introducing a torque into a plastic housing.

BACKGROUND

Metallic holding elements in plastic housings serve to hold or transfer forces, for example, torques, when the plastic housing is being affixed to a carrier or a lid on the plastic housing. In general, holding elements of this nature should enable sufficient anchorage in the surrounding plastic housing, without creating the risk of weakening or even destroying the surrounding plastic housing when applying the holding element or force impact on the holding element. On the other hand, the holding elements must be constructed in such a manner that as little metal material and thus ultimately also as little weight as possible is required, and that they can also be produced at low cost.

Thus, for example, a load introduction element can be derived from DE 10 2012 215 587 A1, wherein a sheath surface is equipped with a contour which features indentations.

A supporting sleeve is known from EP 1468199 B1 and an affixing means is known from EP 2368051 B1 which also feature comparable forms. US 2005/0095078 also presents a blind rivet which already features undercuts in its basic form, which are then further deformed by a force impact on both sides.

A self-punching nut element for pressing into a metal sheet part is known from DE 10 2009 039 817 A, in which the nut element punches an opening into the metal sheet in a self-punching manner, and thereby deforms the displaced metal of the sheet into a groove that surrounds the nut element, and thus also an undercut.

In production technology terms, holding elements with such indentations are complex to create and are therefore expensive, and such a strong deformation as would be necessary to displace the plastic material into such undercuts when pressing into plastic openings, in particular plastic domes with correspondingly limited wall thicknesses, is not possible, and there is a risk that the walls might crack.

A construction element connection made from a metallic element and at least one planar element made of fiber-reinforced plastic is known from DE 297 18 724 U1, in which the holding area is free of incisions, indentations or undercuts, and also corners which are rounded off in profile are also connected through straight edges. However, there the holding element always features a connection section, on which the element is connected to an additionally required further metallic element through spot or plug welding, i.e. it is precisely not primarily affixed via pressing in. Furthermore, said construction element connection is not provided in order to realize a screw fitting to be affixed to it. Additionally, a metallic insert is known from DE 103 19 978 A1 in which the insert is precisely not intended to absorb torques, but with an elongated hole form enables a tolerance compensation between a majority of bore holes, which are arranged on a line accordingly. The profile of the hole in the plastic is adapted accordingly to the profile of the insert.

Additionally, a lead-free material should be suitable for use as far as possible, in order to reduce the pressure on the environment, although several of the known forms require machine processing and thus also a certain amount of lead in the material of the holding element.

The production of the plastic housing is also simplified when the holding element does not have to be overmolded with the material of the plastic housing as an insertion part, but can simply later be pressed in an opening. For this purpose, holding elements with a cylindrical holding area are known, for example.

Then, however, such a holding element with a larger excess size must be pressed into a corresponding opening of the plastic housing, which in turn increases the required edge in the plastic housing around the opening.

In particular when forming a plastic dome protruding from the plastic housing to hold the holding element, this is extremely undesirable, since the width of such a plastic dome increases the size of the plastic housing compared to a circuit board to be arranged in the plastic housing. To the extent that the circuit board should also be machined with the plastic dome, the circuit board surface available for electric construction elements would also be reduced.

All of these requirements therefore contradict each other and priorities must be decided accordingly. As such, it is desirable to present a particularly suitable holding element. In addition, other desirable features and characteristics will become apparent from the subsequent summary and detailed description, and the appended claims, taken in conjunction with the accompanying drawings and this background.

BRIEF SUMMARY

In one exemplary embodiment, a holding element features three, four, or five main corners in a holding area, which are connected to each other via straight or convex edges, and have no concave incisions or indentations, or even undercuts.

In order to avoid comprehension problems, it should be made clear that the terms concave and convex refer to the edges of the profile of the holding area of the holding element. Here, incisions, indentations or undercuts are protruding into the material, curved inwards from a straight-lined connection of two corner points, and thus subsequently according to the standard definition are now referred to as concave. Due to the disadvantages already explained in the introduction, no use is made of these for the invention, and the edges are straight-lined or curved outwards, i.e. convex.

Such a form can preferably be created from a lead-free, metallic material and using cold-formed mass forming. The main corners here engage behind a part of the plastic material in the edge area around the holding element, and enable the edge areas which are pushed back in relation to a theoretic circular diameter, however, and when such a holding element is pressed in, they in particular also enable a displacement of a portion of the plastic material from the main corners in this area of the edges.

In order to enable a screw affixation, the holding element features one of these three alternatives:
a cylindrical bore hole with a specified undersize for holding a self-tapping screw, or
an inner thread, or a tap with an outer thread connected to the holding element.

If one were to further increase the number of main corners, for example to divert to six main corners or even more, the anchoring will increasingly be provided solely by the adhesive friction between the holding element and the surrounding edge of the plastic material.

In one exemplary embodiment, the holding element features precisely three main corners, wherein then the edges are formed as convex curves in each case through one or more obtuse-angled intermediate corners.

The intermediate corners are larger in terms of their angle, i.e. they are even more obtuse-angled, than the 120 degrees of the three main corners, and are arranged at a distance from the main corners. As a result, the holding element can also be realised with a specified diameter of an opening in the interior of the holding element and a specified minimal wall thickness with a smaller corner dimension.

In general, a convex curve form of the edge would also be feasible, but more complex in terms of production technology.

Such a holding element can in particular be equipped with a cylindrical bore hole with a specified lower dimension for holding a self-cutting screw, and the significant torque stress occurs in particular when turning in this screw and forming the groove in the corresponding edge area in the opening.

As an alternative, the opening can also already be equipped with a finished inner thread, and the attachment can thus be conducted with a standard screw. A further alternative emerges when the holding element is connected to an out thread with a tap, onto which a motor can be screwed, for example.

The main corners are preferably rounded, wherein preferably the rounded area of the main corner is maximum 10% of the length of the edge between the main corners.

In one embodiment, as a holding element that can be pressed in an opening into a plastic housing, the holding element includes an insertion area with an outer circumference that tapers inwards towards the middle axis in the direction of the middle axis in the insertion direction, as a result of which such a holding element can centre itself during insertion and can compensate certain production tolerances.

On the opposite side in particular, the holding element can in the direction of the middle axis comprise an edge area with an edge that runs outwards from the middle axis, the outer circumference of which is larger than in the holding area. This edge enlarges the holding area or support area for a circuit board or housing lid, for example, and can also serve as a stop when pressing the holding element into the plastic housing.

Aside from the holding element as such, the plastic housing with the holding element as a roadworthy independent unit is claimed according to one of the claims presented below. Another embodiment results when the plastic housing features a cylindrical press-in opening before pressing in the holding element, since such a cylindrical press-in opening is naturally very easy to produce, while on the other hand, the form of the holding element makes it possible despite this to press into such a cylindrical press-in opening, i.e., one with a circular profile.

In contrast to the pressing in of cylindrical metal bolts into a plastic housing, with a holding element described herein, the surface profile size of the holding element can be designed with a lesser excess dimension in relation to the surface profile size of the press-in opening, and as a result, the press-in opening in the holding area features a surface profile size after the holding element has been pressed in which is maximum 7% larger than the surface profile size of the press-in opening before pressing in, or less than 3.5% larger.

As a result, the mechanical stress of the plastic housing around the holding element is reduced, and when pressing into a plastic dome which protrudes from the plastic housing, this is correspondingly realised with a lesser diameter or lesser wall thickness.

Thus, it is possible for the surface profile size of the press-in opening to correspond before pressing in to between 25 to 60% of the surface profile size of the plastic dome, i.e., a relatively large holding element can be used in relation to the surface profile size of the plastic dome without the risk arising that the walls of the plastic dome will crack.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1A:
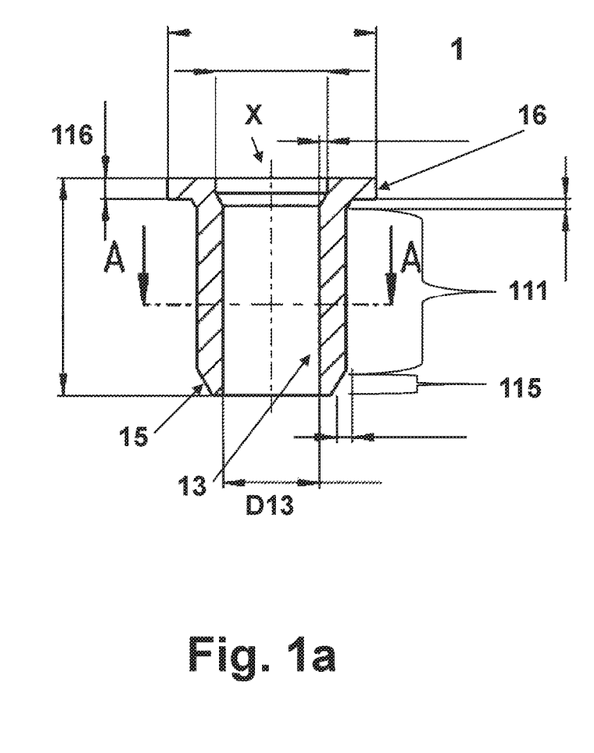
FIGS. 1a and 1b show profile views through a holding element according to one exemplary embodiment.

FIG. 1a shows an exemplary embodiment of the holding element with a longitudinal section along a middle axis X. The holding element 1 includes a holding area 111. In this exemplary embodiment, an edge area 116 with a circumferential edge 16 connected to the holding area 111, on what is here the upper side.

Figure 7:
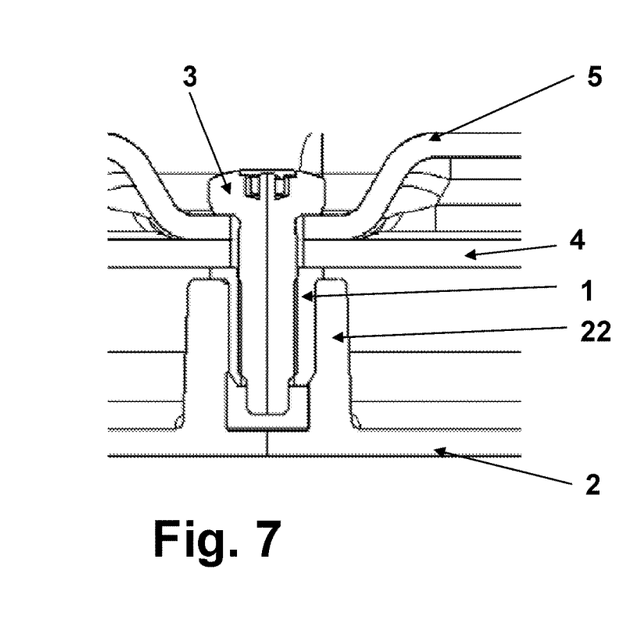
FIG. 7 shows a profile through a mounting area of the plastic housing with installed holding element according to one exemplary embodiment.

This circumferential edge 16 can, on the one hand, serve as a stop when the holding element is pressed into a corresponding opening of a plastic housing. On the other hand, this edge 16 can serve to lay on an enlarged support surface, for example, a circuit board 4 or a base plate 5 as shown in FIG. 7, for affixing a housing part over an accordingly large area. The size and form of the edge 16 is generally freely selectable and can, for example, be kept as a circle, and does not need to feature the main corners 11 of the holding area 111 as will be discussed in greater detail further below.

On the lower side shown in FIG. 1a, in the direction of the middle axis X, the holding element 1 includes an insertion area 115 with a tapering outer circumference inclining inwards towards the middle axis X with a recognisable slope 15. This insertion area 115 on the press-in side serves to provide simple insertion into the press-in opening of the plastic housing. In contrast to the outer circumference form of the holding element 1 in the holding area 111 discussed in greater detail below, the insertion area 115 can taper through to a circular outer circumference.

Figure 1B:
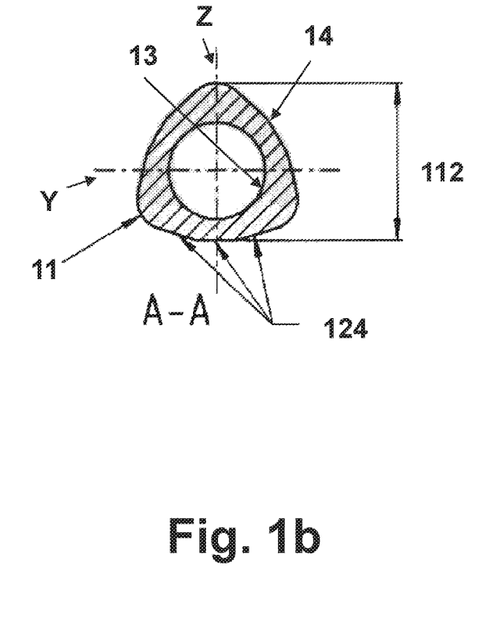

FIG. 1b shows the profile already indicated in FIG. 1a through the holding area 111, on which here precisely three main corners 11 are provided which are connected to each other via edges 12.

FIG. 1b sketches an exemplary embodiment of the edges 12, namely with two obtuse-angled intermediate corners 14, so that the overall form of the edges curves slightly outwards, i.e. in a convex manner. However, it should expressly be noted that in general, straight edges or other convex edge forms, or for example only one obtuse-angled intermediate corner 14, are possible. Due to the disadvantages of production technology, in this holding area 111, however, precisely no incisions or even undercuts are provided in the direction of the middle axis X. The special shape of the edges is discussed in greater detail below in connection with FIG. 6.

The possible alternative number of main corners 11 is also discussed in greater detail below with reference to FIGS. 3, 4, and 5.

Figure 2A:
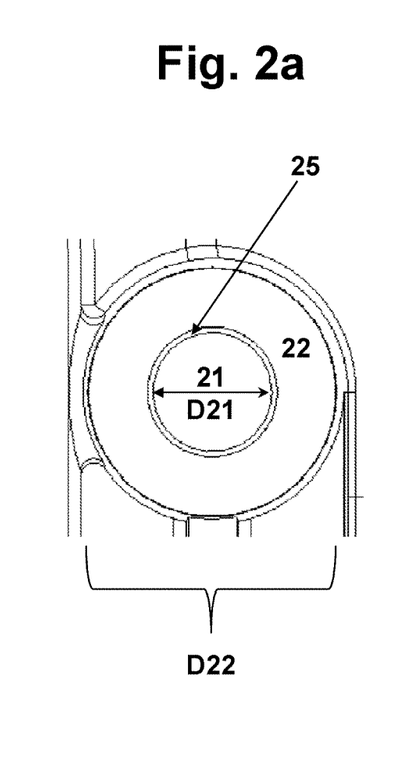
FIG. 2a shows a plastic housing before installation of the holding element according to one exemplary embodiment.

Another exemplary embodiment of the plastic housing 2 will be explained with reference to FIGS. 2a to 2c. FIG. 2a shows a top view onto a so-called plastic dome, i.e., a hollow cylindrical body essentially protruding from the plastic housing, which is shown, for example, in FIG. 7 in profile.

This plastic form 22 defines an opening 21 which includes a circular form and at least, in a corresponding area in the holding area 11 of the holding element 1, a diameter D21. On the lower end of the plastic dome 22, in relation to FIG. 7, the opening can also be formed for a narrow and additional edge 25, which lies so deep in the insertion direction, however, that the holding element 1 can be fully inserted with its holding area 111.

The plastic dome 22 includes an outer diameter D22 and, accordingly, the wall thickness of the dome is (D22−D21)/2. The inner diameter D21 of the dome 22 is here smaller than the corner size 112 sketched in FIG. 1b between the main corner 11 and the respective opposite edge 12 by a specified amount, so that a press-fit of the holding element 1 occurs, wherein the plastic material on the edge of the opening 21 is pressed not only in the press-in direction, but also in the wall areas of the opening 21, located on the side of the main corners 11. As a result, the stress of the plastic dome 22 is, on the one hand, less than when a round bolt is pressed in with a diameter that corresponds to the corner size 112, while on the other hand, however, as a result of this plastic material which engages behind the main corners 22, improved firmness is provided precisely with regard to torque stresses.

The press-in opening 21 features a surface profile size in the holding area after the holding element is pressed in which is a maximum 7% larger than the surface profile size of the press-in opening 21 before pressing in, and preferably less than 3.5% larger. Thus, it is possible that the surface profile size of the press-in opening 21 corresponds before pressing in to between 25 and 60% of the surface profile size of the plastic dome 2, i.e., a relatively large holding element can be used in relation to the surface profile size of the plastic dome, without the risk occurring that the walls of the plastic dome might crack.

Figure 2B:
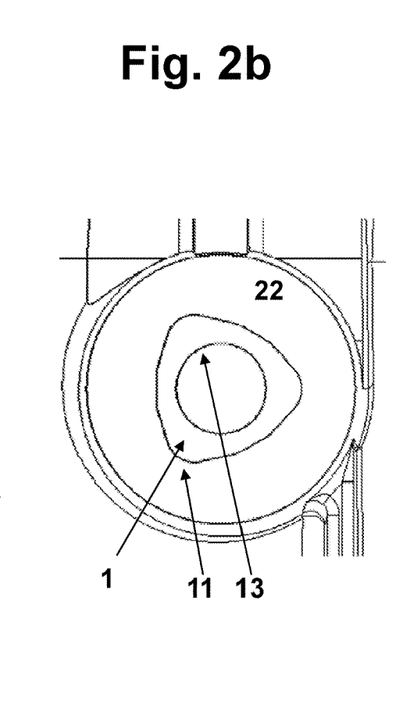
FIG. 2b shows the plastic housing with the holding element installed according to one exemplary embodiment.
Figure 2C:
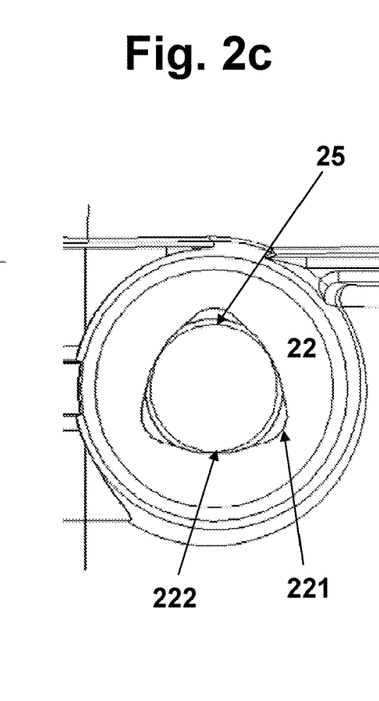
FIG. 2c shows the plastic housing with the holding element removed according to one exemplary embodiment.

FIG. 2b shows a section through the plastic dome 22 with the pressed-in holding element 1. In order to better clarify the effect of the holding element 1 during pressing in and the deformation of the opening 21, in FIG. 2c, a superficial insight is shown into the opening 21, in which the holding element 1 has again been removed. Here, those areas 221 can clearly be seen in which the main corners 11 have cut themselves into the wall of the opening 21, as well as the areas 222 in which material that has accordingly been displaced has also built up, so that there the lower edge 25 can even be partially covered over.

FIG. 3 now again shows the embodiment already described in FIGS. 1 and 2, with three main corners 11 and the intermediate corners.

Figures 3, 4, 5:
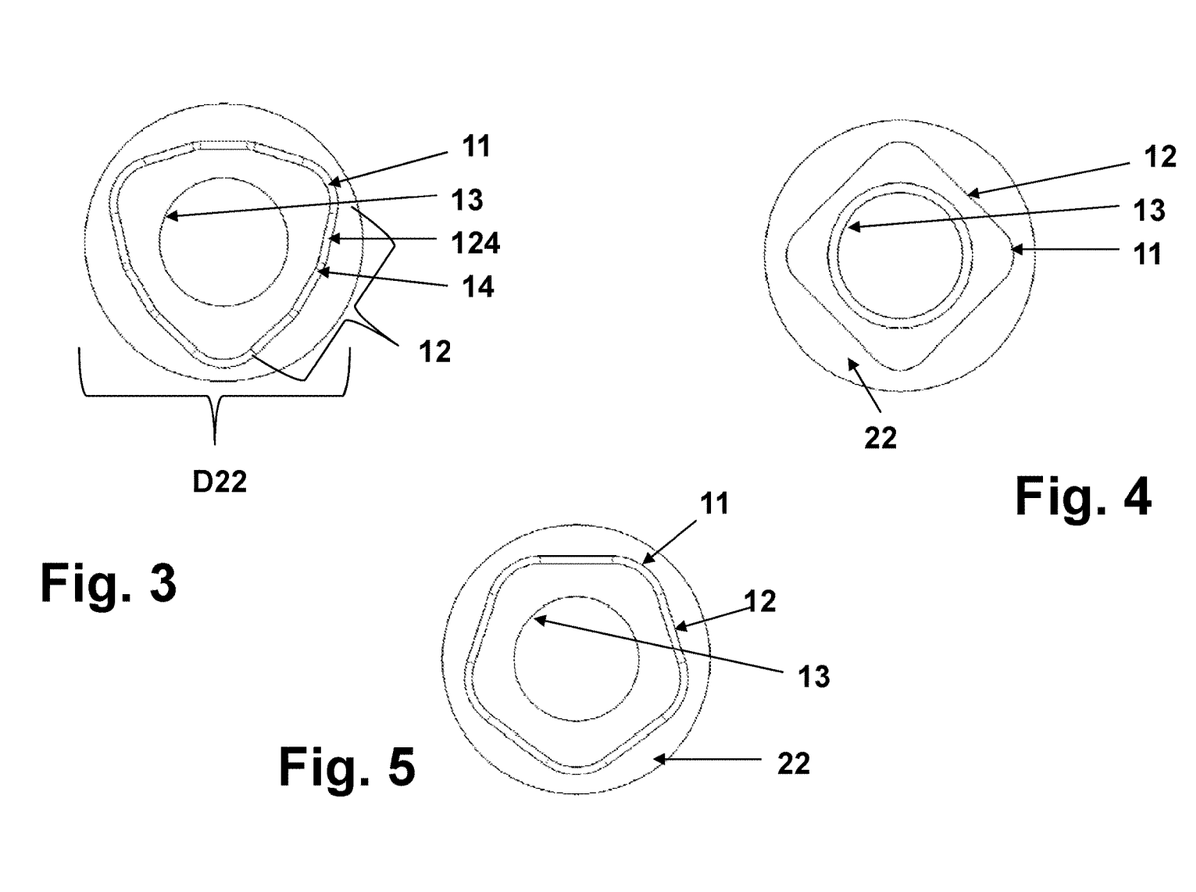
FIG. 3 shows the holding element and the plastic housing with three main corners according to one exemplary embodiment.
FIG. 4 shows the holding element and plastic housing with four main corners according to one exemplary embodiment.
FIG. 5 shows a holding element and plastic housing with five main corners according to one exemplary embodiment.

By contrast, FIG. 4 shows a further exemplary embodiment with in this case four main corners 11, which are also rounded off, but which are otherwise connected with straight edges 12.

FIG. 5 also superficially shows a further exemplary embodiment, here with 5 main corners, which are arranged offset from each other by 72° respectively in the form of a regular pentagon, and which are in turn rounded off, wherein here, too, the edges 12 which lie opposite the main corners 11 respectively are respectively also straight.

In all cases, the main corners 11 respectively ensure a corresponding incision in the edge area of the opening 21 in the plastic housing, and a corresponding displacement of material into the adjacent wall areas. If, however, one were to further increase the number of main corners 11 to above five, the outer circumference form that is created becomes increasingly circular and the form of the main corners 11 in the accessible wall areas become even smaller, so that the key inventive effect is still only insufficient, and thus a number of main corners greater than five appears to be unsuitable.

Figures 6A, 6B, 6C:
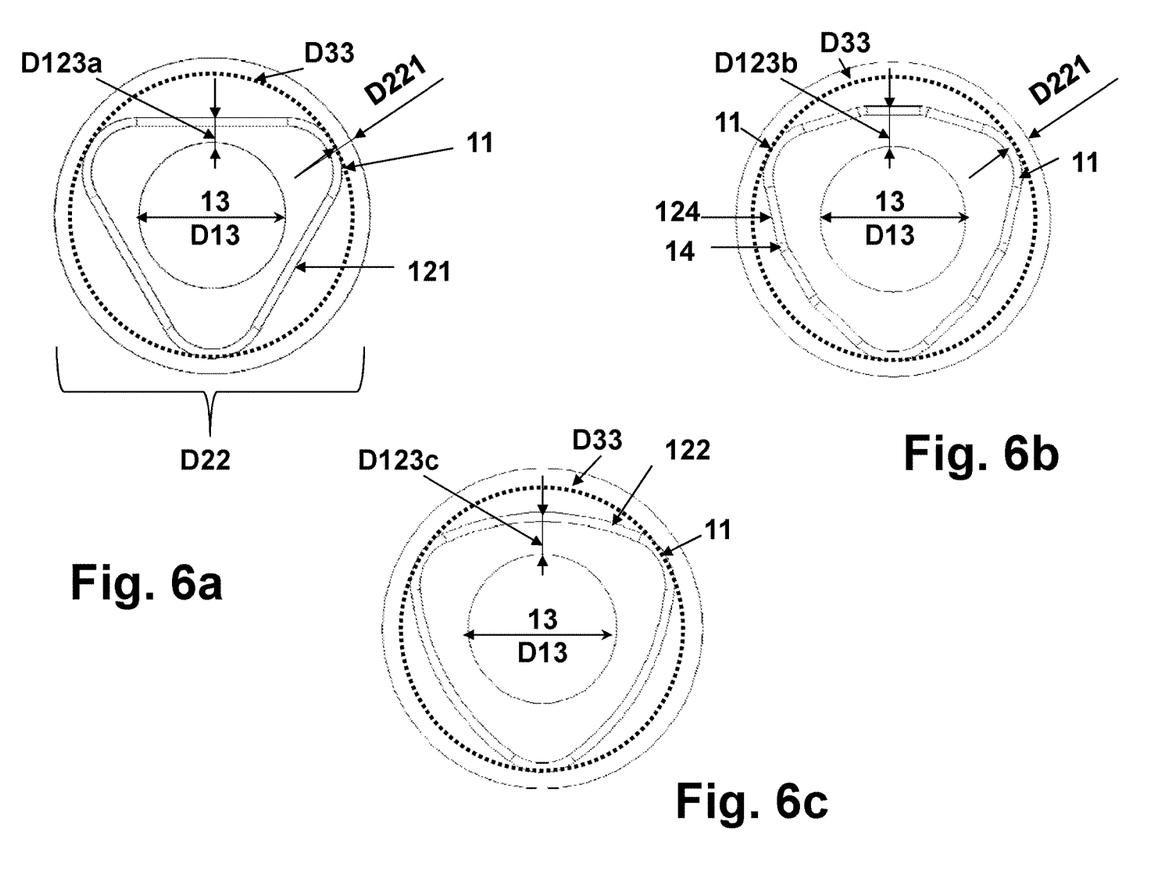
FIGS. 6a-6c show different edge forms and the sizes that may occur.

FIGS. 6a to 6c now, with references to examples with three main corners respectively, sketch the particular influence of the design of the edges for the respective critical minimum thicknesses of the holding element on the one hand, while on the other also for the plastic housing, in particular the plastic dome.

Assuming a uniform inner diameter D13 for all three examples, and a uniform theoretical circular diameter over the main corners D33, a significantly lower minimum wall thickness of the holding element D123 results. In order to achieve sufficient rigidity of the holding element, a minimum wall thickness must be provided.

If one considers that the opening 13 creates a bore hole for holding a self-tapping screw 3 or is equipped with an inner thread and serves to screw in a screw 3, it becomes clear that a corresponding mechanical stress lies on this wall thickness D123. The diameter results from the given inner diameter D13 and minimum wall thickness D123. With variant A, this must be considerably larger than with B and C. As a result, the plastic dome must also be correspondingly larger.

In FIG. 6b, three main corners 11 are connected via edges 12, which respectively feature two obtuse-angled intermediate corners 14 and straight intermediate sections 124, so that the overall forms of the edges 12 are curved in a convex manner in each case. The intermediate corners 14 are here preferably arranged at a respectively identical distance from the main corners 11, wherein instead of the two intermediate corners 14 shown here in FIG. 6b, an embodiment with just one intermediate corner or even three intermediate corners would be feasible, wherein the intermediate corners 14 are respectively more obtuse-angled than the main corners 11.

By contrast, FIG. 6c shows an edge 122 that curves continuously outwards in a convex manner, which also enables a larger minimum wall thickness D123c>D123a than the straight edge 121 in FIG. 6a.

FIG. 7 illustrates a cross-section through the affixing area of a housing of an electronic assembly, including a plastic housing part 2 with a plastic dome 22, in which a metallic holding element 1 according to the invention has been pressed in. The housing is closed on the opposite side by the second housing part 5, wherein said housing part can for example also be metallic. These two housing parts 2 and 5 are connected to each other via a screw 3, which is screwed into the holding element 1. Between the second housing part 5 and the first housing part 2 or the edge 16 of the holding element 1, a circuit board 4 with electronic components is also provided, and also affixed there. As an alternative to this embodiment with a screw 3, affixation via rivets is also feasible. The holding element 1 is free of undercuts in the holding area 111 and has a length in the axis direction X which is shorter than the length of the opening in the plastic dome 22.

Figure 8:
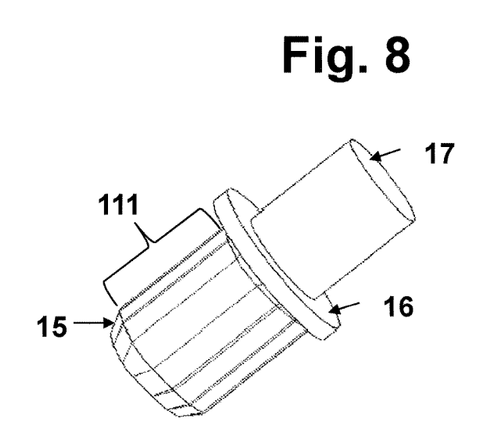
FIG. 8 shows a holding element with a molded-on bolt according to one exemplary embodiment.

FIG. 8, by contrast, sketches a further embodiment with a tap 17 connected to the holding element 1 with an outer thread, wherein the affixing area 111 of the holding element 1 in turn features a profile form as described in greater detail above. This embodiment, too, is suitable for providing that the holding element 1 is produced from a lead-free, metallic material and using cold-formed mass forming.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A holding assembly comprising:
    a plastic housing defining an opening;
    a metallic holding element configured to be pressed into the opening of the plastic housing,
    wherein the metallic holding element includes a holding area free from concave incisions, indentations, or undercuts, and in its profile form includes only three main corners, which are connected to each other via edges, wherein the edges are respectively curved in a convex manner through one or more obtuse-angled intermediate corners;
    wherein the holding area engages the plastic housing to absorb or introduce a torque in the plastic housing,
    wherein the metallic holding element further includes any one of:
        a) a cylindrical bore hole with a specified lower dimension for holding a self-tapping screw, or
        b) an inner thread, or
        c) a tap with an outer thread connected to the holding element.

2. The holding assembly according to claim 1 wherein the opening of the plastic housing is cylindrical before the pressing-in of the holding element.

3. The holding assembly according to claim 1 wherein the opening of the plastic housing includes a surface profile size near the holding area of the metallic holding element after the pressing-in of the metallic holding element which is maximum 7% larger than the surface profile size of the press-in opening before the pressing-in of the metallic holding element.

4. The holding assembly according to claim 3, wherein the opening of the plastic housing includes a surface profile size near the holding area of the metallic holding element after the pressing-in of the metallic holding element which is maximum 3.5% larger than the surface profile size of the press-in opening before the pressing-in of the metallic holding element.

5. The holding assembly according to claim 1, wherein the opening of the plastic housing is arranged as a plastic dome.

6. The holding assembly according to claim 5, wherein the surface profile size of the opening of the plastic housing defines a surface profile size before pressing-in which corresponds to between 25 and 60% of the surface profile size of the plastic dome.

7. The holding assembly according to claim 1, wherein the holding area features a length in the direction of a middle axis which is less than a corresponding length of the provided opening in the plastic housing.

* * * * *